Sept. 7, 1937.  A. N. PORTER  2,092,180
BEAM HANGER
Filed Nov. 18, 1935  2 Sheets-Sheet 1
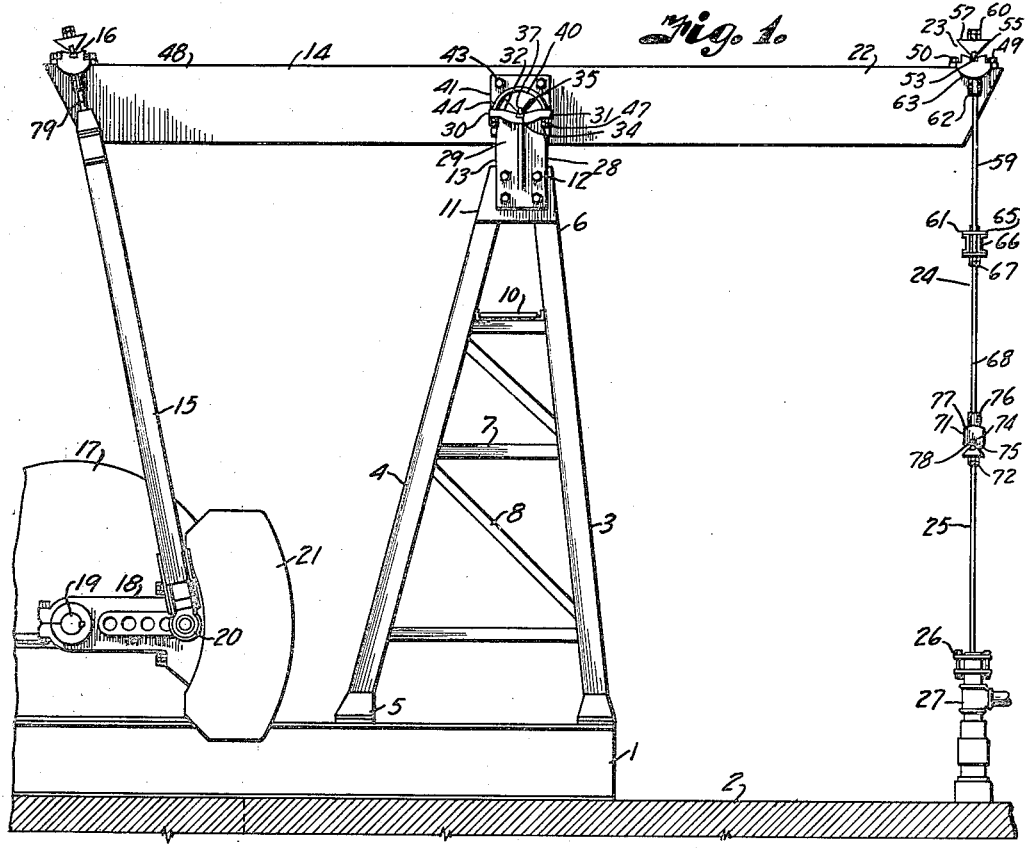
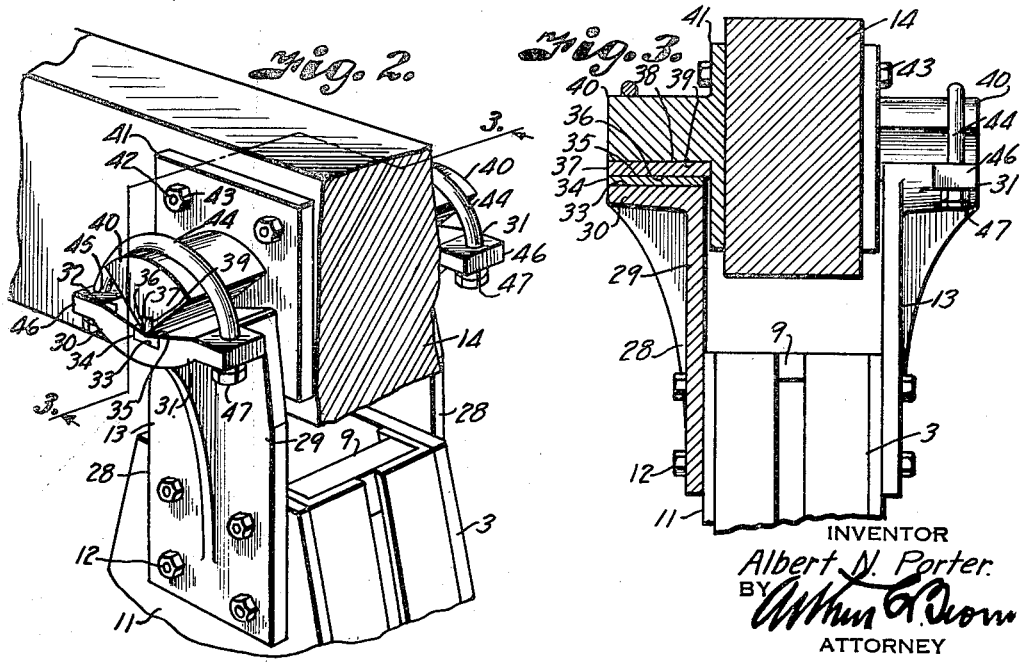
INVENTOR
Albert N. Porter.
BY
ATTORNEY

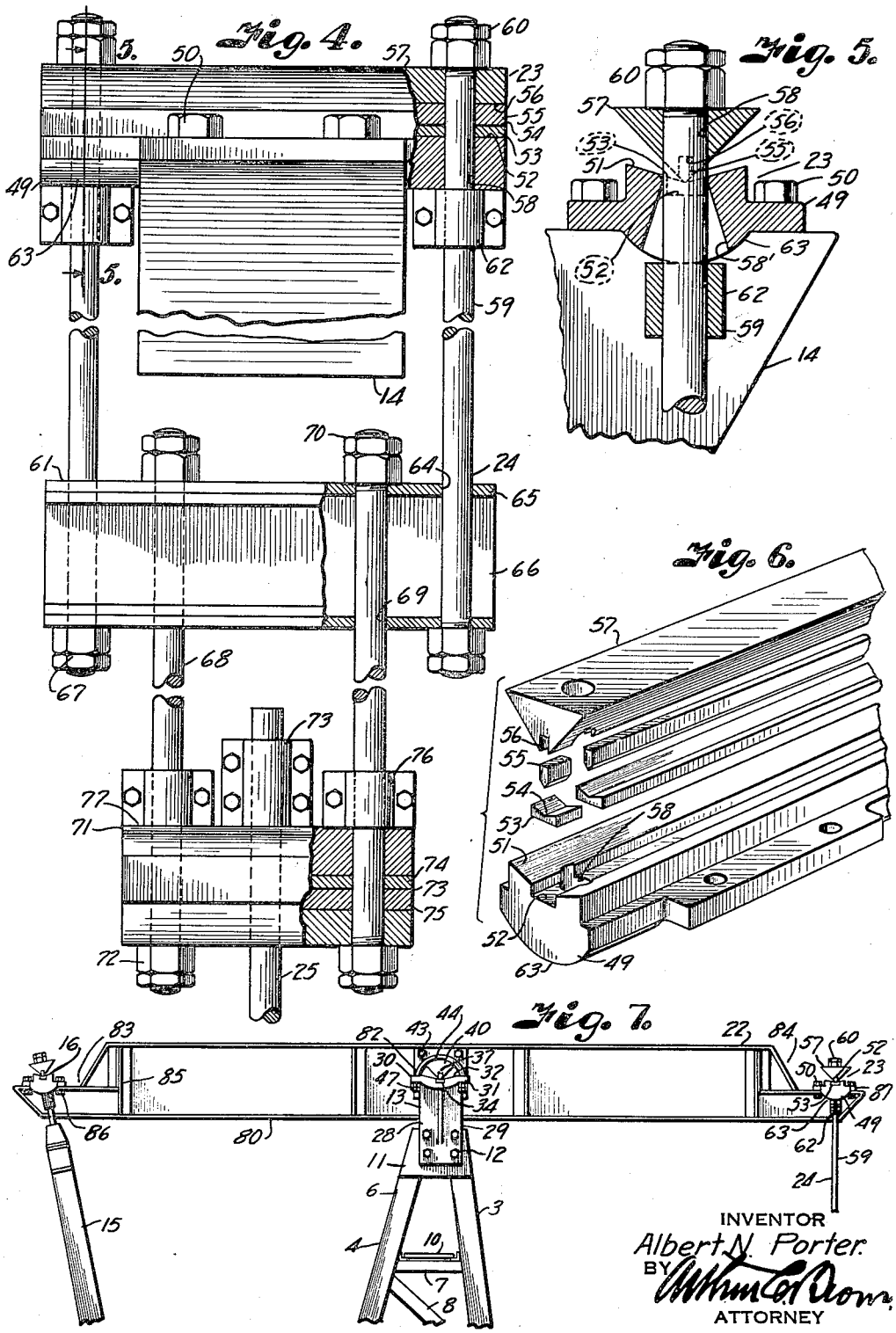

Patented Sept. 7, 1937

2,092,180

UNITED STATES PATENT OFFICE 2,092,180

BEAM HANGER

Albert N. Porter, Tulsa, Okla., assignor to J. F. Darby, Tulsa, Okla.

Application November 18, 1935, Serial No. 50,319

6 Claims. (Cl. 255—11)

This invention relates to oil-less bearings and more particularly to bearings for walking beams and hangers used in the drilling and pumping of oil wells.

The principal objects of the present invention are to provide a knife bearing for the hanging movable parts of oil well equipment for which no lubrication is necessary, and which consequently does not require the attention of workmen; to provide a bearing of durable qualities which produces little or no friction and therefore prolongs the life of the bearing; to provide a seat for the bearing which prevents any jarring action during operation of equipment supported by the bearing, thereby eliminating shearing, or breaking of the bearing seat; and to provide an efficient, inexpensive bearing for these purposes.

In accomplishing these and other objects of the invention, I have provided improved details of structure, the preferred forms of which are illustrated in the accompanying drawings, wherein:

Fig. 1 is a side elevational view of a conventional pumping rig equipped with my invention for supporting the walking beam on a Samson post and for connecting a pitman, and a string of pumping rods, to the beam.

Fig. 2 is a detail perspective view, showing the walking beam supported on the Samson post by bearings embodying the features of the present invention, and showing the strap which retains the bearing elements in seated condition.

Fig. 3 is an enlarged detail vertical cross-section on the line 3—3, Fig. 2.

Fig. 4 is an enlarged end view of the polish rod hanger, showing my improved bearing connection between the walking beam, polish rod hanger and polish rod, portions being broken away to better illustrate the construction.

Fig. 5 is an enlarged vertical section through the bearing on the line 5—5, Fig. 4.

Fig. 6 is a detail, perspective view of my improved bearing and bearing seat in disassembled relation, particularly illustrating the contacting elements of the bearing.

Fig. 7 is a fragmentary side elevation of a pumping rig showing my invention applied to a modified form of walking beam in which the pivot points of the bearing are in the same horizontal plane.

Referring more in detail to the drawings:

1 designates a suitable foundation resting on a derrick floor or similar base 2 for supporting a Samson post 3, which in this case is shown to consist of upwardly extending angle irons 4 supported on suitable outwardly extending flanges 5 resting on the foundation. The angle irons converge at their upper ends, as at 6, and are bracingly spaced by cross irons 7, angle irons 8, and tie rods 9. A platform 10 is also provided for supporting a workman making repairs or the like.

A pair of gusset plates 11 are provided for connecting the upper ends of the angles forming the Samson post. The Samson post 3 and plates 11 are provided with openings for passing bolts retained by the nuts 12 for clamping walking beam side irons, generally designated 13, to the Samson post. The side irons 13, later more specifically referred to, comprises the features of my present invention and support a walking beam 14, one end of which is provided with a pitman 15 through a connection 16 embodying my invention, and also later described. The pitman 15 is actuated by a prime mover (not shown) through a suitably connected speed reduction gear 17, having a crank 18 keyed on the driven shaft 19. The crank arm has holes for receiving the end bearings 20 of the pitman for adjusting the lengths of stroke of the walking beam, and the outer end of the crank 18 is provided with a suitable counter-balance 21.

The other or forward end 22 of the walking beam 14 is provided with a bearing 23 embodying the features of my invention and to which is connected a polish rod hanger generally designated 24 for suspending a polish rod 25 operating in the stuffing box 26 of an oil well casing head 27.

While I have generally described the preferred adaptation to which my invention is well suited, it is obvious that my improved bearing may be adapted to many other uses in which knife bearings are utilized.

Referring now more specifically to the form of my invention particularly illustrated in Fig. 2 of the drawings wherein it is applied to the connection between the Samson post and walking beam, the side irons 13 comprise upright castings 28, having webs 29 for bracing integral, laterally extending flanges 30 and 31.

The flanges 30 and 31 are bevelled inwardly and downwardly, as at 32, and terminate in a cut out socket 33 for receiving a bearing seat 34. The bearing seat 34 is of harder and more durable metal, for example a steel alloy, than the castings 28 and is machined to form a continuation of the bevel 32 for forming a V-shaped trough 35, as shown in Fig. 6, for receiving the knife edge 36 of the bearing insert 37. The insert is formed of material similar to the seat 34, and is of generally rectangular shape but having downwardly tapering lower edges to form the knife edge 36 for engaging in the trough 35.

The upper squared end 38 of the insert is fitted into a socket 39, Fig. 2, of a segment 40 which is formed integrally with a casting 41 clamped to the walking beam 14 by bolts 42 and nuts 43. The segment 40 extends laterally from the casting 41 in such a manner that the insert at the radial base thereof lies parallel with and engages the trough 35 of the seat 34. It is apparent that as the walking beam is rocked on the Samson post the only contact therewith will be through the insert edges, and that therefore friction will be reduced to a minimum.

In order to avoid any jarring or shearing effect between the knife insert and the seat insert, incident to jerking, rocking motion of the walking beam through the prime mover, I provide arcuate shaped anchor rods 44, extending over the segment 40 and having its ends engaging in holes 45 of ears 46, formed integrally with the flanges 30 and 31.

The ends of the rods may be threaded for receiving nuts 47 by which the rods may be retained in position to engage the arcuate shaped periphery of the segment and maintain a constant edge to seat contact between the knife and trough of the bearing. While the castings 28 are separated by the walking beam, they are similarly constructed, and the description of one will suffice for the other.

The power end 48 of the walking beam 14 is provided with the bearing 16, and the working end 22 of the walking beam above the well casing is provided with the bearing 23. Both bearings are of similar construction, an example of which is particularly illustrated in Fig. 5, wherein 22 designates the end of the walking beam which is provided with a bearing portion 49. The bearing portion 49 is clamped to the walking beam in a suitable manner as by bolts 50, to retain the bearing portion in position. The upper end of the bearing portion is inwardly and downwardly bevelled, as at 51, and terminates in a tooled socket 52, which is provided with a seat insert 53, similar to the insert 34, previously described.

Seating in the insert trough 54 is a knife insert 55 of a construction similar to the knife insert 37, previously described, which is fitted in a slot 56 in the basic apex of a triangular bar 57. The bar 57 is provided with holes for passing through-bolts 59 having nuts 60 through the bar inserts and holes 58 in the bearing portions for downward extension to be engaged by a polish rod hanger 61 for suspending a polish rod in adjusted position relative to the walking beam. The holes 58 are downwardly and outwardly tapered to allow for movement of the bolts 59 incidental to the rocking movement of the walking beam.

Collars 62 are provided between the polish rod hanger and the bearing portion 49 for retaining the pivot points in contact, so that no jarring or shearing action will occur, and it is apparent that as the walking beam is reciprocated the collar will be moved in an arc over the rounded lower surface 63 of the bearing 49 to at all times hold the pivot points in direct contact. The bolts 59 pass through holes 64 in plates 65, which form connecting webs for spaced channels 66, said channels being supported on the bolts by nuts 67. Spaced inwardly from the bolts 59 is a pair of bolts 68 which pass through openings 69 in the plates and are retained therein by nuts 70. A coupling 71 is sleeved over the lower ends of the bolts and is retained thereon by nuts 72 threaded on the bolts. The coupling 71 is provided with a hole for passing the polish rod 25, a collar 73 retaining the polish rod in position relative to the coupling. The coupling is constructed in a manner similar to that of the bearings 16 and 23, i. e. the upper and lower portions thereof are provided with inserts 74 and 75 cooperating, when the walking beam is moved, to pivot the polish rod at a single edged point to prevent friction and crystallization of the rods by constant bending. The knife bearing is retained in engagement by collars 76 on the bolts 68 engaging the surface 77 of the coupling.

In Fig. 1, the position of the bearing points of the polish rod relative to the hanger are shown to have been inverted in such a manner that the triangular bar is at the bottom and the wedge-shaped trough pivots over the apex of the triangle as shown at 78.

It is apparent that as the well end of the walking beam is raised and lowered, the pumping rods will rock on the bearing edges 78 and 54 so that all wear of the bearings will be eliminated due to the pivoting or rocking action of the bearings instead of the usual sliding action of conventional bearings. Providing the walking beam and the rod hanger with my improved bearings will also reduce polish rod wear to a minimum, due to the freer action of the bearing connections.

The power end of the walking beam is provided with a bearing similar to the bearing 23 already described, but which couples directly with the pitman by means of the rod 79 secured to the bearing 15 by a connection similar to the connections 59, 60 and 62, and to the pitman, in any suitable manner. It is apparent that wear will be prevented by the use of my invention at the bearing connection between the walking beam and the pitman.

It will be noted that the end bearings and the center bearing of the walking beam are in different horizontal planes, this being the conventional construction.

In Fig. 7, I have shown a form of walking beam 80, pivoted on a Samson post 3 by means of a bearing 82 similar to the walking beam bearing previously described. In this form of walking beam, the pivot points of all of the bearings are in the same horizontal plane, the ends of the walking beam having been cut down as at 83 and 84, and properly braced by angles and webbing 85. Provision is also made for suitably clamping and bracing the bearings, as at 86 and 87.

In assembling an apparatus constructed as described, and assuming that the Samson post and prime mover are in the proper relative positions, the walking beam is provided with the castings 41, the outwardly extending segments of which are seated on the castings 28 of the Samson post. The pitman is then secured to the arm 17 in whatever position is desired for the length of stroke of the walking beam. The upper end of the pitman is then fitted onto the bearing portion 15, and clamped securely to the walking beam. The opposite end of the walking beam is provided with the bearing portion 49, after which the triangular bar 57 is placed thereon and provided with the bolts 59. The polish rod hanger is then sleeved over the bolts and the bolts 68 connected with the hanger for receiving the pivoting coupling 71, after which the polish rod is secured to the coupling, as described, the polish rod thereafter being secured to the pumping rods within the casing of a well.

In operating an apparatus constructed and assembled as described, the prime mover is started, which moves the lower end of the pitman in a circular path giving the walking beam an up and down rocking movement, said movement being transmitted through the bearing points 35 to the outer end of the walking beam and through the bearing 23 and bearing 71 to impart such up and down reciprocatory movement to the pumping rods. Due to the fact that the only points of contact at the working ends of the walking beam and at its pivot are knife edges, it is apparent that no oil is necessary to lubricate such bearings, thereby eliminating the necessity of workmen for this purpose.

It is also apparent that by providing the straps 44 and the collars 62, the walking beam will not be moved out of contact with its bearings, and will, therefore, not impart a jarring effect which otherwise would tend to shear the bearings and the castings.

From the foregoing it is apparent that I have provided an apparatus which will efficiently operate pumping or drilling equipment, and which will materially reduce maintenance costs incident to oil well drilling and pumping.

What I claim and desire to secure by Letters Patent is:

1. A beam hanger for the walking beam of a pumping rig, including complementary bearing members one having a knife edge engaging in a substantially V-shape seat of the other to form a substantially knife edge bearing between said members, means fixing one of the bearing members to the walking beam with the knife edge bearing extending across the width of the beam, a pair of reins, means connecting the reins with the other bearing member at the outer ends of said knife edge bearing, means on the reins engaging the fixed bearing member and cooperating with said rein connecting means of the other bearing member to retain said knife edge and V-shape seat in cooperative engagement, and means connecting the reins with a polish rod.

2. A beam hanger for the walking beam of a pumping rig, including complementary bearing members one having a knife edge engaging in a substantially V-shape seat of the other to form a substantially knife edge bearing between said members, one of said members having rein engaging apertures and the other slots aligning with the apertures at the ends of the knife edge bearing, means fixing the bearing member having the slots to the walking beam with the knife edge bearing extending across the width of the beam, reins extending through the slots and the aligning apertures, means connecting the reins with the bearing member having the apertures, means on the reins engaging the fixed bearing member and cooperating with said rein connecting means of the other bearing member to retain said knife edge and V-shape seat in cooperative engagement, and means connecting the reins with a polish rod.

3. A beam hanger for the walking beam of a pumping rig, including complementary bearing members one having a knife edge engaging in a substantially V-shape seat of the other to form a substantially knife edge bearing between said members, means fixing one of the bearing members to the walking beam with the knife edge bearing extending across the width of the beam, rein engaging portions on the other member projecting beyond the sides of the beam, reins connected with the rein engaging portions, arcuate guide means on the fixed member, means on the reins engaging the arcuate guide means on the fixed member to retain said knife edge and V-shape seat in co-operative engagement, and means connecting the reins with a polish rod.

4. A beam hanger for the walking beam of a pumping rig, including complementary bearing members one having a knife edge engaging in a substantially V-shape seat of the other to form a substantially knife edge bearing between said members, one of said members having rein engaging apertures and the other slots aligning with the apertures at the ends of the knife edge bearing, means fixing the bearing member having the slots to the walking beam with the knife edge bearing extending across the width of the beam, arcuate shape guide portions aligning with the slots, reins extending through the slots of the fixed memmber and the aligning apertures of the other member, means connecting the reins with said other member, means on the reins engaging the arcuate shape guide portions and cooperating with said connecting means to retain said knife edge and V-shape seat in cooperative engagement, and means connecting the reins with the polish rod.

5. A beam hanger for the walking beam of a pumping rig, including complementary bearing members one having a knife edge engaging in a substantially V-shape seat of the other to form a substantially knife edge bearing between said members, means fixing one of the bearing members to the walking beam with the knife edge bearing extending across the width of the beam, a pair of reins, means connecting one end of the reins with the other bearing member at the outer ends of said knife edge bearing, means on the reins engaging the fixed bearing member and cooperating with said rein connecting means of the other bearing member to retain said knife edge bearing and V-shape seat in cooperative engagement, and means connecting the lower ends of the reins and cooperating with said other bearing member to retain the reins in parallel alignment.

6. A beam hanger for a walking beam of a pumping rig, including complementary bearing members one having a knife edge engaging in a substantially V-shape seat of the other to form a substantially knife edge bearing between said members, one of said members having rein engaging apertures and the other slots aligning with the apertures at the ends of the knife edge bearing, means fixing the bearing member having the slots to the walking beam with the knife edge bearing extending across the width of the beam, reins extending through the slots and the aligning apertures, means connecting the upper ends of the reins with the bearing member having the apertures, means on the reins engaging the fixed bearing member and cooperating with said rein connecting means of the other bearing member to retain said knife edge and V-shape seat in co-operative engagement, means interconnecting the lower ends of the reins, and means connecting a polish rod with said interconnecting means.

ALBERT N. PORTER.